Oct. 14, 1941.  W. C. PETERMAN  2,259,323
PHOTOELECTRIC VACUUM TUBE AMPLIFIER
Filed June 25, 1940  2 Sheets-Sheet 1
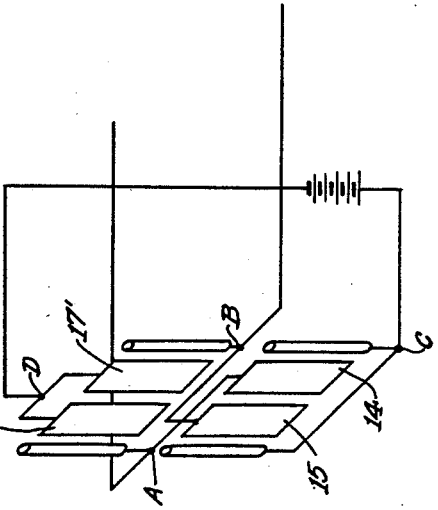
FIG.IA.
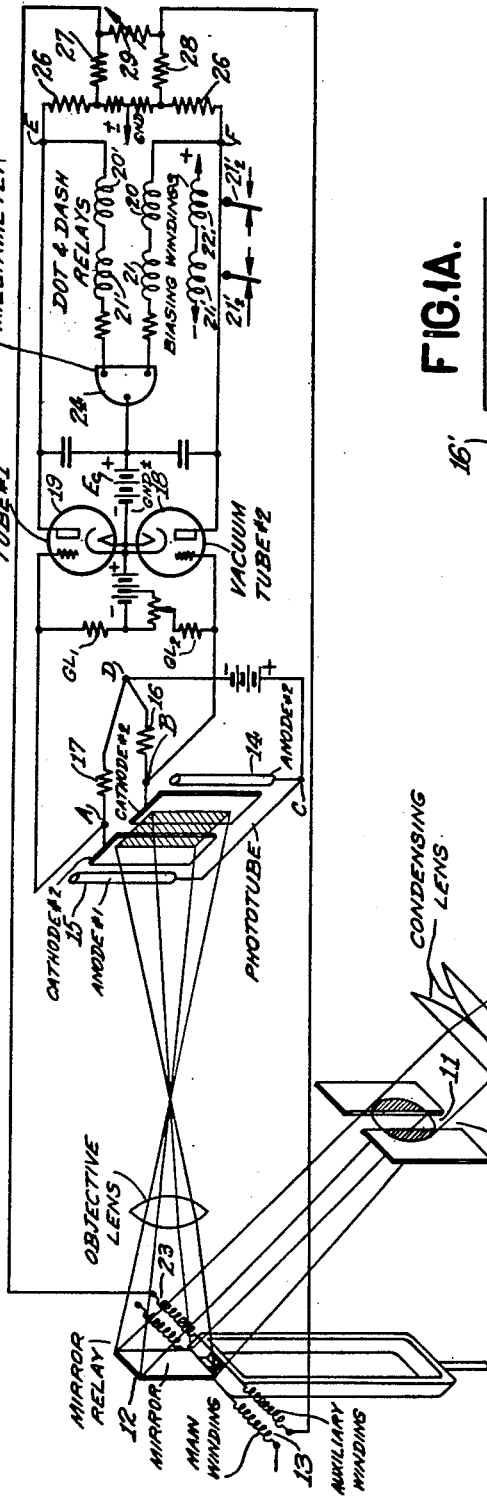
FIG.I.
INVENTOR.
WILLIAM C. PETERMAN
BY
ATTORNEY.

Oct. 14, 1941.  W. C. PETERMAN  2,259,323
PHOTOELECTRIC VACUUM TUBE AMPLIFIER
Filed June 25, 1940  2 Sheets-Sheet 2

INVENTOR.
WILLIAM C. PETERMAN
BY R C Hapgood
ATTORNEY.

Patented Oct. 14, 1941

2,259,323

UNITED STATES PATENT OFFICE 2,259,323

PHOTOELECTRIC VACUUM TUBE AMPLIFIER

William C. Peterman, Brooklyn, N. Y., assignor to All America Cables, Incorporated, New York, N. Y., a corporation of New York Application June 25, 1940, Serial No. 342,319

6 Claims. (Cl. 250—41.5)

This invention relates to amplifiers and more particularly to photo-electric vacuum tube amplifiers used for example at cable terminations.

The present receiver arrangements where galvanometer repeaters are used are subject to certain troubles such as fragility, tendency to bias and difficulty in obtaining sufficient amplification. The low amplitude output necessitates the use of very sensitive relays which are inherently subject to contact troubles.

It is a principal object of my invention to devise an amplifier which is free from some or all of these deficiencies and faults.

In general this is accomplished by providing photo-electric cells, or other inertless means responsive to the displacement of a galvanometer coil, means for amplifying the signal output from said inertless means, and a feed-back arrangement for coupling the output of said amplifier in negative or opposing phase relation to an auxiliary winding on the galvanometer.

Vacuum tube amplifier circuits, the input of which are controlled by the output of photoelectric tubes, have been used in prior art structures. These in general have been directed, among other uses, to other types of systems, for example, measuring instruments. In these known arrangements systems using a reverse phase feed-back to the pointer instrument to maintain distortion free indications of relatively reduced amplitude have not been provided.

Figure 2:
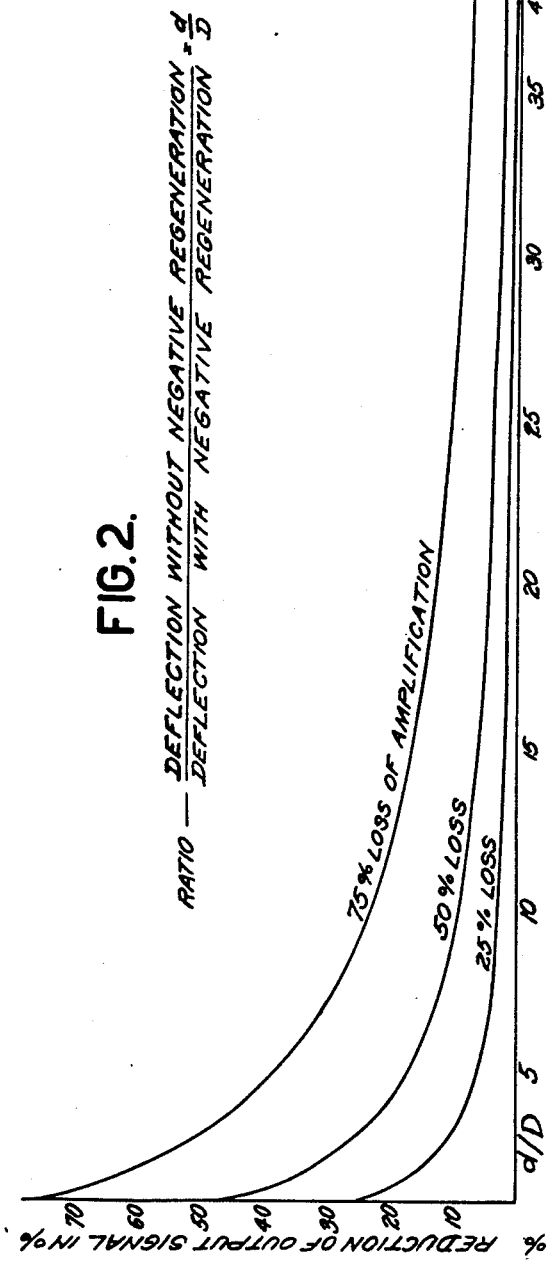
Figure 3:
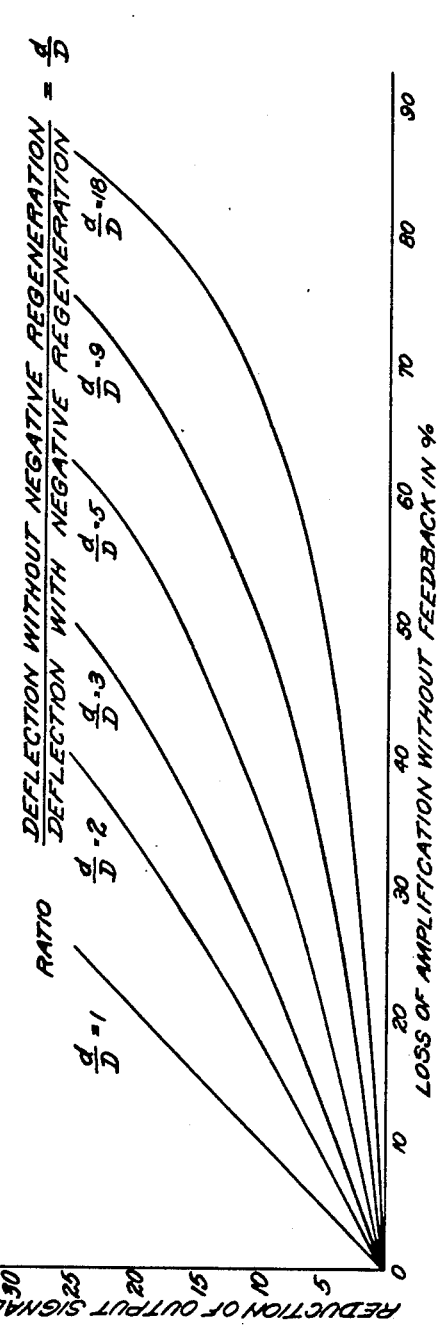

A better understanding of my invention as well as other objects and features thereof may be gathered from the particular description thereof made in connection with the accompanying drawings, in which Fig. 1 illustrates a circuit incorporating a preferred embodiment of my invention, Fig. 1A shows a modification of the bridge of Fig. 1, and Figs. 2 and 3 illustrate a set of curves showing operating characteristics of a system in accordance with my invention.

This amplifier employs a combination of photo tubes and vacuum tubes. The voltage amplification is obtained largely through the photo tubes, while the vacuum tubes serve to utilize the amplified voltage to produce an amplifier current in a low resistance receiver.

As arranged for this amplifier, an intense light illumination from lamp 10, a slot 11, and the light from the slot is concentrated on a small mirror 12 attached to the coil 13 of the receiving instrument by focusing a straight coiled filament of the lamp on the mirror. The light from the mirror 12 is reflected on the cathodes of two photo cells 14, 15 and the optical system so adjusted that an image of the illuminated slot is focused on the two photo cells. The photo cells are connected as the arms of a Wheatstone bridge; having two photo-cells 14, 15, and two resistances 16, 17, as illustrated in Fig. 1 or four photo-cells 14, 15, 16', 17' as shown in Fig. 1A. Positive voltage is applied to the anode arms of the bridge and vacuum tubes 18, 19, in a push-pull arrangement, are connected across the diagonal of the bridge at A, B.

The light is so arranged that, when no current is flowing through the main coil 13 of the receiving instrument, the image of slot 11 will fall equally on the two cathodes of tubes 14, 15.

Under this condition the current flowing through each photo-cell is the same and since the bridge arms AD and BD are equal, there is no voltage across the bridge diagonal AB and therefore no voltage applied to the grids of the vacuum tubes 18, 19. These grids normally have approximately equal negative potential $E_c$ applied through the grid leaks $GL_1$ and $GL_2$ to assure equal output. To take care of slight inequalities in the tubes, a potentiometer system is provided associated with $GL_2$. This normal negative potential produces equal currents in the two plate circuits. Coils 20, 20' and 21, 21' of the dot and dash relay are connected in each plate circuit in a push-pull arrangement so that equal currents in the two plate circuits neutralize each other in each relay. The tongues $21_2$, $21_2'$ of both relays are then held on their spacing contacts by a biasing current through a third winding $21_1$, $21_1'$ on each relay.

When the current flows through main coil 13 winding in one direction, the light beam moves, say, to the right. This causes unequal currents to flow through the photo-cells 14, 15, a difference of potentiometer is established across the bridge diagonal AB and across the two grid leaks $GL_1$ and $GL_2$ in series. When these grid leaks are equal in value half of this potential difference is applied from the grid to the cathode of each vacuum tube 18, 19, positive potential to one grid and an equal negative potential to the other grid. This causes the plate current of one tube to increase and that of the other tube to decrease. Thus, if the current change is sufficient, one relay will be operated and the other more heavily spaced.

This inequality of current in the plate circuits of the two tubes produces a corresponding difference of potential from the point C to the point D. A reversal of current direction in the receiving instrument main coil 13 will reverse the direction of this potential and, if sufficiently large, will operate the other relay.

If a small fractional part of the output current of the amplifier is fed back into an auxiliary winding 23 of the mirror receiving instrument coil in such a way as to reduce the beam deflection caused by the current in the main winding 13, the amplification is reduced but made more stable. That is, the output will be less subject to variation of illumination of the cathodes of the photo tubes 14, 15 (whether due to change of lamp voltage, lamp filament deterioration, or dirt on lenses or mirrors) or variation in the vacuum tubes. Without this negative feedback the output for a given input would of course vary directly as the total change in amplification due to the above causes.

In order to investigate this subject let us assume that for current through the main winding only (1) $$d = K I_m T_m$$

where, $d$ = beam deflection at photo-cell in inches
$I_m$ = current in main coil in amp.
$T_m$ = turns on main coil
$K$ = deflection in inches per ampere turn Likewise, with current in auxiliary coil only (2) $$d = K I_a T_a$$

where, $I_a$ = current in the auxiliary winding
$T_a$ = turns on auxiliary winding
$K$ = same as above When, from any cause, the beam on the photo-cell is deflected a distance of $d$ inches, a current is sent through the auxiliary winding 23 of the mirror relay. Let this relation between beam deflection and auxiliary coil current be expressed by (3) $$I_a = nd$$

where $I_a$ = current in auxiliary winding
$d$ = beam deflection at photocell in inches
$n$ = amperes produced through the auxiliary coil per inch of deflection If now a current $I_M$ is sent through the main winding 13 and a fractional part $I_A$ of the amplified current is sent through the auxiliary winding 23 in a negative sense, resulting in a deflection D, we have the relation:

(4) $$D = K I_M T_M - K I_A T_A$$

Also from Equation 3:

(5) $$I_A = nD$$

where $I_A$ and D have the same values in Equations 4 and 5.

Substituting the values of $I_A$ from Equation 5 into Equation 4 we get:

(6) $$D = K I_M T_M - K n D T_A$$

or (7) $$D = \frac{K T_M}{1 + K n T_A} I_M$$

Substituting this value of D in Equation 5 we have:

(8) $$I_A = \frac{n K T_M}{n K T_A + 1} I_M$$

These relations are true for any values of $T_M$ and $T_A$ and for simplicity we will assume $T_M = T_A = T$ when from Equation 7:

(9) $$D = \frac{KT}{1 + nKT} I_M$$

and from Equation 8:

(10) $$I_A = \frac{nKT}{nKT + 1} I_M = \frac{I_M}{1 + \frac{1}{nKT}}$$

From Equation 10 it can be seen that if $n$ is large and the factor $$\frac{1}{nKT}$$

is small compared with 1, a relatively large change in the value of $n$ will cause a relatively small change in the value of $I_A$ and therefore a relatively small change in the total output current of the vacuum tubes 18, 19, which total output current is directly proportional to $I_A$. With the push-pull output circuit the output current must be considered as the difference of the two plate currents, as read on the differential milliammeter 24 connected, as shown.

As an example of the stability of the output of this amplifier when the response of the photo tubes or vacuum tubes varies, let $n = 1500 \times 10^{-6}$ amp. per inch
$K = 20$ inches per ampere turn
$T = 500$ turns
$nKT = 15$ From Equation 10

$$I_A = \frac{I_M}{1\frac{1}{15}} = 15/16 I_M$$

If, now, due to light or vacuum tube variation $n$ should decrease 20% to $1200 \times 10^{-6}$ amp. per inch we would have $nKT = 12$ and $$I_A = \frac{I_M}{1\frac{1}{12}} = \frac{12}{13} I_M$$

Thus a decrease of only 1.5% in output results from a 20% decrease in the amplifying power of the photo tubes or vacuum tubes.

It will be seen from the form of Equation 10 that the percentage variation $I_A$ for a given percentage variation in the value of $n$ will depend on the actual value of $n$. Thus, the larger the value of $n$, the smaller the percentage change in $I_A$ for a given percentage change in $n$. This is the reason for having enough amplification so that a large negative degeneration current can be used. Also, it will be noted that for any given value of $n$ the percentage change in $I_A$ will be relatively larger when the percentage change in $n$ is larger. These relations are shown by the family of curves on the attached drawings.

A practical determination of the amount of negative regeneration being used with any given adjustment of the amplifier can be made in the following manner.

Observe the beam deflection $d$ which results from a current I in the main coil winding when the auxiliary coil circuit is open. The relation between the input current and the differential output current of this amplifier is practically linear so that the reading of the differential output meter may be taken as a measure of the deflection.

From Equation 1 we have

(11) $$d = KTI$$

assuming $$T_M = T_A = T$$

Now apply negative regeneration by closing the auxiliary coil circuit and observe the deflection D with the same current in the main winding.

From Equation 9 we have the relation for this condition:

(12) $$D = \frac{KTI}{1+nKT}$$

Therefore, from Equations 11 and 12

$$\frac{d}{D} = 1 + nKT$$

or $$nKT = \frac{d}{D} - 1$$

The quantity of $nKT$ is a measure of the negative regeneration. By substituting this value of $nKT$ into Equation 10 and assuming percentage changes in the value of $nKT$ (proportional to $n$) the stability of the amplifier under the given operating conditions can be determined.

The output of amplifier tubes 18, 19 may be applied across a potential divider resistance arrangement, the center point being grounded to reduce the potential to ground of auxiliary coil 23. A resistance pad comprises resistance elements 27, 28, and adjustable resistor 29 is preferably provided to reduce the auxiliary coil current to the proper adjusted value.

The mirror galvanometer coil 12 is suspended so that it has a restoring torque when it is moved from its normal rest position. This restoring torque is so adjusted that the natural frequency of the coil is somewhat higher than the frequency of the signal current moving the coil.

In Fig. 2 are shown curves wherein the reduction of output signal in percentage is plotted against the ratio $$\frac{d}{D}$$

as described for 25%, 50% and 75% loss of amplitude.

In Fig. 3 are shown several curves showing the relation between percentage reduction of signal output and percentage loss in amplification without feedback for different values of the ratio $$\frac{d}{D}$$

While I have described a single embodiment of my invention, it should be understood that the principles thereof are readily applicable to other equivalent circuits. For example, other types of galvanometers may be used, and different manners of deriving the feedback currents may be used without departing from the spirit of my invention.

What I consider as my invention and desire to protect is embodied in the accompanying claims.

What I claim is:

1. A signal amplifier circuit comprising a source of light, signal receiving means responsive to receipt of signals for displacing light from said source angularly according to the received signals, light responsive means in the path of said source to produce a resultant voltage of a magnitude dependent upon the displacement of said light, amplifying means responsive to said resultant voltage, signal responsive means in the output of said amplifying means, and separately connected means for feeding back a portion of said amplifier output to said signal receiving means in opposition whereby said displacement of said light and the consequent output from said amplifier will be of lower amplitude and substantially free of distortions developed in said circuit.

2. A signal amplifier circuit according to claim 1, wherein said light sensitive means comprises a pair of photo-electric cells arranged as arms of a normally balanced bridge circuit, and said amplifying means comprises a pair of vacuum tubes in push-pull connection, connected across a diagonal of said bridge.

3. A signal amplifier circuit comprising a source of light, a signal supplying source, a galvanometer having a main winding connected to said signal supply source and being arranged to deflect light from said source in accordance with said signals, means responsive to said light for producing output currents in accordance with said deflections, an auxiliary winding in said galvanometer, and means electrically coupled to said last named means for supplying a portion of said output currents to said auxiliary winding in a direction opposed to the currents supplied to said main winding by said signal supply source, whereby distortions in said circuit are minimized.

4. A signal amplifier circuit according to claim 3, wherein said means responsive to said light deflections comprises a pair of photo-electric cells arranged as arms of a normally balanced bridge, a pair of amplifier tubes in push-pull connection across a diagonal of said bridge, and an output circuit for said amplifier tubes.

5. A signal amplifier circuit according to claim 3, wherein said means responsive to said light deflections comprises a pair of photo-electric cells arranged as arms of a normally balanced bridge, a pair of amplifier tubes in push-pull connection across a diagonal of said bridge, an output circuit for said amplifier tubes, further comprising a differential signal indicator coupled to said output circuit, and a potential dividing network connected in parallel to said signal indicator for controlling the amount of said output currents fed back to said auxiliary coil.

6. A signal amplifier circuit according to claim 3, wherein said means responsive to said light deflections comprises four photo-electric cells arranged as arms of a normally balanced bridge, a pair of amplifier tubes in push-pull connection across a diagonal of said bridge, and an output circuit for said amplifier tubes.

WILLIAM C. PETERMAN.